United States Patent [19]
Hoshino et al.

[11] Patent Number: 5,739,860
[45] Date of Patent: Apr. 14, 1998

[54] METHOD OF AND APPARATUS FOR DECODING MOVING PICTURE AND OUTPUTTING DECODED MOVING PICTURE IN NORMAL OR FRAME-SKIPPED REPRODUCING OPERATION MODE

[75] Inventors: Akio Hoshino, Kodaira; Takafumi Kikuchi, Kokubunji; Tadashi Saitoh, Koganei; Junichi Kimura, Hachioji; Yutaka Okunoki, Kawaguchi; Masao Oshimi, Kawasaki, all of Japan

[73] Assignees: Hitachi, Ltd.; Sega Enterprises, Ltd., both of Tokyo, Japan

[21] Appl. No.: 560,372

[22] Filed: Nov. 17, 1995

[30] Foreign Application Priority Data

Nov. 17, 1994 [JP] Japan ................................. 6-283839

[51] Int. Cl.$^6$ ........................................... H04N 7/26
[52] U.S. Cl. .......................... 348/384; 348/411; 348/467; 348/726
[58] Field of Search .......................... 348/439, 384, 348/411, 416, 699, 402, 423, 467, 639, 641, 726; 358/313

[56] References Cited

U.S. PATENT DOCUMENTS

| | | | |
|---|---|---|---|
| 4,575,756 | 3/1986 | Furukawa | 358/136 |
| 5,253,054 | 10/1993 | Fujiwara et al. | 358/133 |
| 5,416,521 | 5/1995 | Chujoh et al. | 348/411 |
| 5,440,345 | 8/1995 | Shimoda | 348/411 |
| 5,623,314 | 4/1997 | Retter et al. | 348/423 |

OTHER PUBLICATIONS

Journal of Television Society of Japan, vol. 48, No. 1, pp. 44–49 (1994) "MPEG 2/H.262", Hiroshi Watanabe.

Vol. 48, No. 1, pp. 31–37 (1994) "LSIs for Highly Efficient Video Coding" Kiichi Matsuda et al.

*Primary Examiner*—Glenton B. Burgess
*Attorney, Agent, or Firm*—Antonelli, Terry, Stout, & Kraus, LLP

[57] ABSTRACT

In a moving picture decoding apparatus, an output section is provided with a circuit for making a logic sum of control signals for renewing a picture data output, as a control signal for determining a picture data to be next outputted in a selected mode. Thereby, according to a request, newly decoded picture data is discarded or an inputted picture data is discarded without being decoded, and picture data which is currently being outputted is outputted again. In response to a control signal for renewing the output, decoded picture data to be outputted subsequently is outputted and picture data which is currently being outputted is discarded.

11 Claims, 15 Drawing Sheets

FIG. 3A

| LAPSE OF TIME | FM1 | FM2 | FM3 | FM4 | REPRODUCING OPERATION MODE |
|---|---|---|---|---|---|
| INITIAL STATE | EMPTY | EMPTY | EMPTY | EMPTY | NORMAL |
| | I1 DECODED | EMPTY | EMPTY | EMPTY | |
| | I1 | P4 DECODED | EMPTY | EMPTY | |
| | I1 READ OUT | P4 | B2 DECODED | EMPTY | |
| | I1 | P4 | B2 READ OUT | B3 DECODED | |
| | P7 DECODED | P4 | EMPTY | B3 READ OUT | |
| APPLICATION OF FRAME-SKIPPED REPRODUCING OPERATION MODE REQUEST SIGNAL | P7 | P4 READ OUT | B5 DECODED | EMPTY | |
| | P7 | P4 | B5 READ OUT | B6 DECODED | |
| | P7 | P10 DECODED | EMPTY | B6 READ OUT | |
| | P7 READ OUT | P10 | B8 DECODED | EMPTY | |
| | P7 | P10 | B8 READ OUT | B9 DECODED | |
| | P13 DECODED | P10 | B8 READ OUT | EMPTY | |
| | P13 | P10 | B8 READ OUT | B11 DECODED | FRAME-SKIPPED |
| | P13 | P10 | B8 READ OUT | B12 DECODED | |
| | P13 | P16 DECODED | B8 READ OUT | EMPTY | |
| | P13 | P16 | B8 READ OUT | B14 DECODED | |
| REMOVAL OF FRAME-SKIPPED REPRODUCING OPERATION MODE REQUEST SIGNAL | P13 | P16 | B8 READ OUT | B15 DECODED | |
| | P19 DECODED | P16 | B8 READ OUT | EMPTY | |
| | P19 | P16 | B8 READ OUT | B17 DECODED | |
| | P19 | P16 | B8 READ OUT | B18 DECODED | |
| | P19 | P22 DECODED | EMPTY | B18 READ OUT | |
| APPLICATION OF FRAME-SKIPPED REPRODUCING OPERATION MODE REQUEST SIGNAL | P19 READ OUT | P22 | B20 DECODED | EMPTY | NORMAL |
| | P19 | P22 | B20 READ OUT | B21 DECODED | |
| | P25 DECODED | P22 | EMPTY | B21 READ OUT | |
| | P25 | P22 READ OUT | B23 DECODED | EMPTY | |
| | P25 | P22 READ OUT | B24 DECODED | EMPTY | |
| | P25 | P22 READ OUT | P28 DECODED | EMPTY | |
| | P25 | P22 READ OUT | P28 | B26 DECODED | |
| | P25 | P22 READ OUT | P28 | B27 DECODED | |
| | P31 DECODED | P22 READ OUT | P28 | EMPTY | FRAME-SKIPPED |
| | P31 | P22 READ OUT | P28 | B29 DECODED | |
| REMOVAL OF FRAME-SKIPPED REPRODUCING OPERATION MODE REQUEST SIGNAL | P31 | P22 READ OUT | P28 | B30 DECODED | |
| | P31 | P22 READ OUT | P34 DECODED | EMPTY | |
| | P31 | P22 READ OUT | P34 | B32 DECODED | |
| | P31 | P22 READ OUT | P34 | B33 DECODED | |
| | P31 | P37 DECODED | P34 | P33 READ OUT | |
| | P35 DECODED | P37 | P34 READ OUT | EMPTY | |
| | P35 READ OUT | P37 | P34 | B36 DECODED | |
| | P40 DECODED | P37 | EMPTY | B36 READ OUT | NORMAL |
| | P40 | P37 READ OUT | B38 DECODED | EMPTY | |
| | P40 | P37 | B38 READ OUT | B39 DECODED | |

FIG. 4A

| LAPSE OF TIME | FM1 | FM2 | FM3 | FM4 | REPRODUCING OPERATION MODE |
|---|---|---|---|---|---|
| INITIAL STATE | EMPTY | EMPTY | EMPTY | EMPTY | NORMAL |
| | I1 DECODED | EMPTY | EMPTY | EMPTY | |
| | I1 | P4 DECODED | EMPTY | EMPTY | |
| | I1 READ OUT | P4 | B2 DECODED | EMPTY | |
| | I1 | P4 | B2 READ OUT | B3 DECODED | |
| | P7 DECODED | P4 | EMPTY | B3 READ OUT | |
| | P7 | P4 READ OUT | B5 DECODED | EMPTY | |
| | P7 | P4 | B5 READ OUT | B6 DECODED | |
| | P7 | P10 DECODED | EMPTY | B6 READ OUT | |
| | P7 READ OUT | P10 | B8 DECODED | EMPTY | |
| | P7 | P10 | B8 READ OUT | B9 DECODED | |
| | P13 DECODED | P10 | EMPTY | B9 READ OUT | |
| | P13 | P10 READ OUT | B11 DECODED | EMPTY | |
| | P13 | P10 | B11 READ OUT | B12 DECODED | |
| | P13 | P16 DECODED | EMPTY | B12 READ OUT | |
| | P13 READ OUT | P16 | B14 DECODED | EMPTY | |
| | P13 | P16 | B14 READ OUT | B15 DECODED | |
| | P19 DECODED | P16 | EMPTY | B15 READ OUT | |
| | P19 | P16 READ OUT | B17 DECODED | EMPTY | |
| | P19 | P16 | B17 READ OUT | B18 DECODED | |
| | P19 | P22 DECODED | EMPTY | B18 READ OUT | |
| | P19 READ OUT | P22 | B20 DECODED | EMPTY | |
| | P19 | P22 | B20 READ OUT | B21 DECODED | |
| | P25 DECODED | P22 | EMPTY | B21 READ OUT | |
| | P25 | P22 READ OUT | B23 DECODED | EMPTY | |
| | ⋮ | ⋮ | ⋮ | ⋮ | |

FIG. 5

| LAPSE OF TIME | FM1 | FM2 | FM3 | FM4 | REPRODUCING OPERATION MODE |
|---|---|---|---|---|---|
| INITIAL STATE | EMPTY | EMPTY | EMPTY | EMPTY | NORMAL |
| | I1 DECODED | EMPTY | EMPTY | EMPTY | |
| | I1 | P4 DECODED | EMPTY | EMPTY | |
| | I1 READ OUT | P4 | B2 DECODED | EMPTY | |
| | I1 | P4 | B2 READ OUT | B3 DECODED | |
| | P7 DECODED | P4 | EMPTY | B3 READ OUT | |
| APPLICATION OF FRAME-SKIPPED REPRODUCING OPERATION MODE REQUEST SIGNAL | P7 | P4 READ OUT | B5 DECODED | EMPTY | |
| | P7 | P4 | B5 READ OUT | B6 DECODED | |
| | P7 | P10 DECODED | EMPTY | B6 READ OUT | |
| | P7 READ OUT | P10 | B8 DECODED | EMPTY | |
| | P7 | P10 | B8 READ OUT | B9 DECODED | |
| | P13 DECODED | P10 | B8 READ OUT | EMPTY | |
| | P13 | P10 | B8 READ OUT | B11 DECODED | |
| | P13 | P10 | B8 READ OUT | B12 DECODED | |
| | P13 | P16 DECODED | B8 READ OUT | EMPTY | |
| | P13 | P16 | B8 READ OUT | B14 DECODED | |
| | P13 | P16 | B8 READ OUT | B15 DECODED | |
| APPLICATION OF OUTPUT RENEWAL REQUEST SIGNAL | P19 DECODED | P16 | B8 READ OUT | EMPTY | |
| | P19 | P16 | B8 READ OUT | B17 DECODED | |
| | P19 | P16 | B8 READ OUT | B18 DECODED | |
| | P19 | P22 DECODED | EMPTY | B18 READ OUT | FRAME-SKIPPED |
| | P19 | P22 | B20 DECODED | B18 READ OUT | |
| | P19 | P22 | B21 DECODED | B18 READ OUT | |
| | P25 DECODED | P22 | EMPTY | B18 READ OUT | |
| APPLICATION OF OUTPUT RENEWAL REQUEST SIGNAL | P25 | P22 | B23 DECODED | B18 READ OUT | |
| | P25 | P22 | B24 DECODED | B18 READ OUT | |
| | P25 | P28 DECODED | EMPTY | B18 READ OUT | |
| | P25 READ OUT | P28 | B26 DECODED | EMPTY | |
| | P25 READ OUT | P28 | EMPTY | B27 DECODED | |
| | P25 READ OUT | P28 | B31 DECODED | EMPTY | |
| REMOVAL OF FRAME-SKIPPED REPRODUCING OPERATION MODE REQUEST SIGNAL | P25 READ OUT | P28 | P31 | B29 DECODED | |
| | P25 READ OUT | P28 | P31 | B30 DECODED | |
| | P25 READ OUT | P34 DECODED | P31 | EMPTY | |
| | P25 READ OUT | P34 | P31 | B32 DECODED | |
| | P33 DECODED | P34 | P31 | B32 READ OUT | |
| | P33 READ OUT | P34 | B37 DECODED | EMPTY | |
| | EMPTY | P34 READ OUT | P37 | B35 DECODED | |
| | P36 DECODED | P34 | P37 | B35 READ OUT | NORMAL |
| | P36 READ OUT | P40 DECODED | P37 | EMPTY | |
| | EMPTY | P40 | B37 READ OUT | B38 DECODED | |
| | P39 DECODED | P40 | P37 | B38 READ OUT | |

FIG. 9

| LAPSE OF TIME | FM1 | FM2 | FM3 | REPRODUCING OPERATION MODE |
|---|---|---|---|---|
| INITIAL STATE | EMPTY | EMPTY | EMPTY | NORMAL |
| | I1 DECODED | EMPTY | EMPTY | |
| | I1 | P4 DECODED | EMPTY | |
| | I1 READ OUT | P4 | B2 DECODED | |
| | I1 | P4 | B2 READ OUT   B3 DECODED | |
| APPLICATION OF FRAME-SKIPPED REPRODUCING OPERATION MODE REQUEST SIGNAL | P7 DECODED | P4 | B3 READ OUT | |
| | P7 | P4 READ OUT | B5 DECODED | |
| | P7 | P4 | B5 READ OUT   B6 DECODED | |
| | P7 | P10 DECODED | B6 READ OUT | |
| | P7 | P10 | B6 READ OUT | FRAME-SKIPPED |
| | P7 | P10 | B6 READ OUT | |
| | P13 DECODED | P10 | B6 READ OUT | |
| | P13 | P10 | B6 READ OUT | |
| | P13 | P10 | B6 READ OUT | |
| | P13 | P16 DECODED | B6 READ OUT | |
| | P13 | P16 | B6 READ OUT | |
| | P13 | P16 | B6 READ OUT | |
| REMOVAL OF FRAME-SKIPPED REPRODUCING OPERATION MODE REQUEST SIGNAL | P19 DECODED | P16 | B6 READ OUT | |
| | P19 | P16 | B6 READ OUT | |
| | P19 | P16 | B6 READ OUT | |
| | P19 | P22 DECODED | B6 READ OUT | |
| APPLICATION OF FRAME-SKIPPED REPRODUCING OPERATION MODE REQUEST SIGNAL | P19 READ OUT | P22 | B20 DECODED | NORMAL |
| | P19 | P22 | B20 READ OUT   B21 DECODED | |
| | P25 DECODED | P22 | B21 READ OUT | |
| | P25 | P22 READ OUT | B23 DECODED | |
| | P25 | P22 READ OUT | EMPTY | |
| | P25 | P22 READ OUT | P28 DECODED | |
| | P25 | P22 READ OUT | P28 | |
| | P25 | P22 READ OUT | P28 | |
| | P31 DECODED | P22 READ OUT | P28 | FRAME-SKIPPED |
| | P31 | P22 READ OUT | P28 | |
| | P31 | P22 READ OUT | P28 | |
| | P31 | P22 READ OUT | P34 DECODED | |
| REMOVAL OF FRAME-SKIPPED REPRODUCING OPERATION MODE REQUEST SIGNAL | P31 | P22 READ OUT | P34 | |
| | P31 | P22 READ OUT | P34 | |
| | P37 DECODED | P22 READ OUT | P34 | |
| | P37 | P35 DECODED | P34 READ OUT | |
| | P37 | B35 READ OUT   B36 DECODED | P34 | |
| | P37 | P36 READ OUT | P40 DECODED | NORMAL |
| | 37 READ OUT | P38 DECODED | P40 | |
| | P37 | B38 READ OUT   B38 DECODED | P40 | |

FIG. 10

| LAPSE OF TIME | FM1 | FM2 | FM3 | REPRODUCING OPERATION MODE |
|---|---|---|---|---|
| INITIAL STATE | EMPTY | EMPTY | EMPTY | NORMAL |
| | I1 DECODED | EMPTY | EMPTY | |
| | I1 | P4 DECODED | EMPTY | |
| | I1 READ OUT | P4 | B2 DECODED | |
| | I1 | P4 | B2 READ OUT    B3 DECODED | |
| | P7 DECODED | P4 | B3 READ OUT | |
| | P7 | P4 READ OUT | B5 DECODED | |
| | P7 | P4 | B5 READ OUT    B6 DECODED | |
| | P7 | P10 DECODED | B6 READ OUT | |
| | P7 READ OUT | P10 | B8 DECODED | |
| | P7 | P10 | B8 READ OUT    B9 DECODED | |
| | P13 DECODED | P10 | B9 READ OUT | |
| | P13 | P10 READ OUT | B11 DECODED | |
| | P13 | P10 | B11 READ OUT  B12 DECODED | |
| | P13 | P16 DECODED | B12 READ OUT | |
| | P13 READ OUT | P16 | B14 DECODED | |
| | P13 | P16 | B14 READ OUT  B15 DECODED | |
| | P19 DECODED | P16 | B15 READ OUT | |
| | P19 | P16 READ OUT | B17 DECODED | |
| | P19 | P16 | B17 READ OUT  B18 DECODED | |
| | P19 | P22 DECODED | B18 READ OUT | |
| | 19 READ OUT | P22 | B20 DECODED | |
| | P19 | P22 | B20 READ OUT  B21 DECODED | |
| | P25 DECODED | P22 | B21 READ OUT | |
| | P25 | P22 READ OUT | B23 DECODED | |
| | ⋮ | ⋮ | ⋮ | |

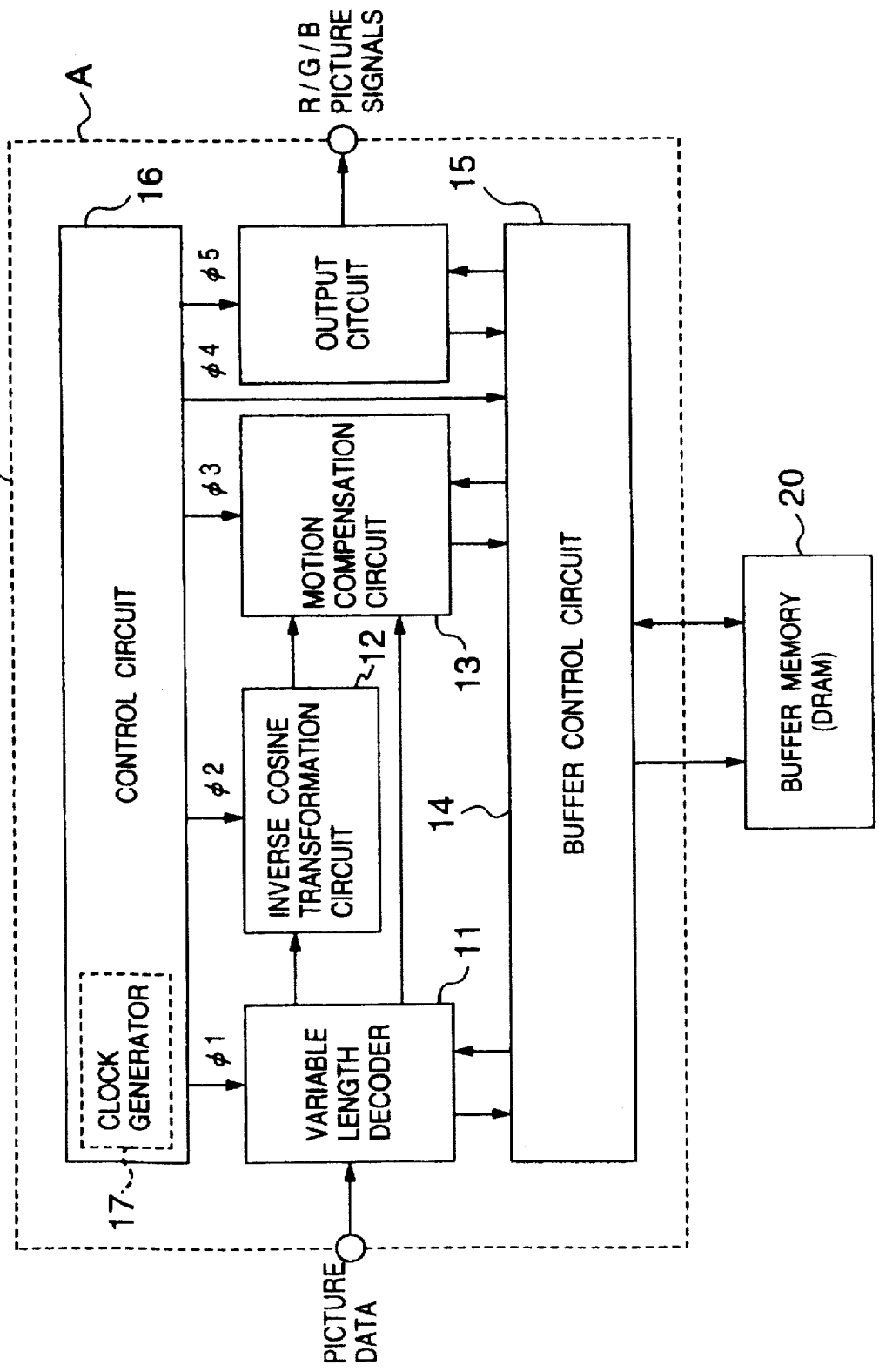

METHOD OF AND APPARATUS FOR DECODING MOVING PICTURE AND OUTPUTTING DECODED MOVING PICTURE IN NORMAL OR FRAME-SKIPPED REPRODUCING OPERATION MODE

CROSS-REFERENCE TO RELATED APPLICATION

The present application is related to application Ser. No. 08/560,018 filed on Nov. 17, 1995, by Takafumi Kikuchi, Tadashi Saitoh, and Yutaka Okunoki, which corresponds to Japanese application No. 6-283836 filed on Nov. 17, 1994. The contents of application Ser. No. 08/560,018 are hereby incorporated by reference in their entirety in the present application.

BACKGROUND OF THE INVENTION

The present invention relates to a moving picture decoding apparatus and method for decoding coded moving pictures, and in particular to a moving picture decoding apparatus and method having special picture outputting function such as frame-skipped reproducing function.

Conventional moving picture decoding apparatuses need a wide frequency band to transmit picture data and a large memory area to store picture data. Therefore, various compression methods are employed to encode moving pictures, and the amount of picture data is significantly reduced by using time-based correlation among picture data of several frames.

The MPEG (Moving Picture Expert Group) video standard is one of them. According to this standard, data storage capacity of color moving pictures can be significantly reduced. As techniques for reducing the storage capacity, it uses the following techniques:

(1) two-dimensional compression using discrete cosine transformation;
(2) motion compensation based upon time-based prediction; and
(3) entropy coding using variable length coding.

Furthermore, since the MPEG video standard employs time-based prediction it, requires memory areas for storing a plurality of picture data. And memory area allocation is performed under the following conditions, with picture data decoding being performed at the same time.

(1) Inputted picture data is allocated to a predetermined memory area.
(2) For data of a type not to be referred to, only a memory area corresponding to one frame is prepared because the data is not referred to in the decoding process. Picture data of this type is outputted while being decoded. In some cases, one memory area is simultaneously accessed for reading and writing.
(3) For data of a type to be referred to, a memory area corresponding to two frames is prepared. Picture data of this type is not discarded while it is being referred to. In other words, it may be discarded when second or next picture data of a type to be referred to after itself has been inputted. As for an outputting operation, it can be outputted when the next picture data of the type to be referred to has been inputted.

Details of the MPEG video standard are described in ISO/IEC 11172-1/2/3: Information Technology-coding of Moving Pictures and Associated Audio for Digital Storage Media at up to about 1.5 Mbit/s", International Standard, 1993.

SUMMARY OF THE INVENTION

An object of the present invention is to provide a moving picture decoding apparatus and a method in which decoding is continued even if picture data currently being outputted is held.

Another object of the present invention is to provide a moving picture decoding apparatus and a method capable of realizing, in outputting picture data, a special function such as frame-skipped reproducing function without using any special purpose exterior circuit.

In accordance with one aspect of the present invention, a decoding apparatus for achieving the above described object includes a memory section having memory areas for storing picture data of three or more frames, a decoding section for decoding coded picture data, an output section for outputting decoded picture data, a controlling section for controlling the whole apparatus, and a memory, provided in the output section, for storing a first information on a number of a memory area from which picture data is currently being outputted and a second information on a number of a memory area from which picture data is to be subsequently outputted.

In an embodiment of the present invention, a control signal effective in a certain mode and a control signal effective in a mode other than the certain mode are inputted, so that at the time when the output is renewed, decoded picture data to be outputted subsequently is discarded and picture data which is currently being outputted is outputted again. In response to a control signal for renewing the output in the predetermined mode, decoded picture data to be outputted subsequently is outputted and picture data which is currently being outputted is discarded. As a result, decoding can be continued even if picture data which is currently being outputted is held.

In accordance with another aspect of the present invention, there is provided an apparatus for decoding an input train of coded picture data carrying moving picture information and for outputting a train of picture data thus decoded, the apparatus having a frame-skipped reproducing function, the input train of coded picture data containing picture data of type used as reference for decoding other picture data and picture data of type not used as reference for decoding other picture data, the apparatus including: a controlling section, a memory section, a decoding section for decoding the picture data input train under control of the controlling section, the memory section storing picture data decoded by the decoding section and holding the picture data for a first time interval under control of the controlling section, and an output section responsive to a frame-skipped reproducing request signal supplied from outside, for outputting at least one decoded picture data from the memory section continuously for a second time interval, the first and second time intervals depending upon the frame-skipped reproducing request signal.

BRIEF DESCRIPTION OF THE DRAWINGS

FIG. 3A shows an example of allocation of four frame memories in the normal reproducing operation mode and a frame-skipped reproducing operation mode of a video decoding system according to an embodiment of the present invention.

FIG. 4A shows an exmple of allocation of the frame memories in the normal reproduction operation mode of a video decoding system using four frame memories.

FIG. 5 shows another example of allocation of four frame memories in the normal reproducing operation mode and the frame-skipped reproducing operation mode of a video decoding system according to an embodiment of the present invention.

FIG. 9 shows an example of allocation of three frame memories in the normal reproducing operation mode and the frame-skipped reproducing operation mode of a video decoding system according to an embodiment of the present invention.

FIG. 10 shows an exmple of allocation of the frame memories in the normal reproduction operation mode of a video decoding system using four frame memories.

FIG. 14 is a block diagram showing an example of a configuration of a decoding section of the video decoding system illustrated in FIG. 6.

DESCRIPTION OF THE PREFERRED EMBODIMENTS

Figure 1:
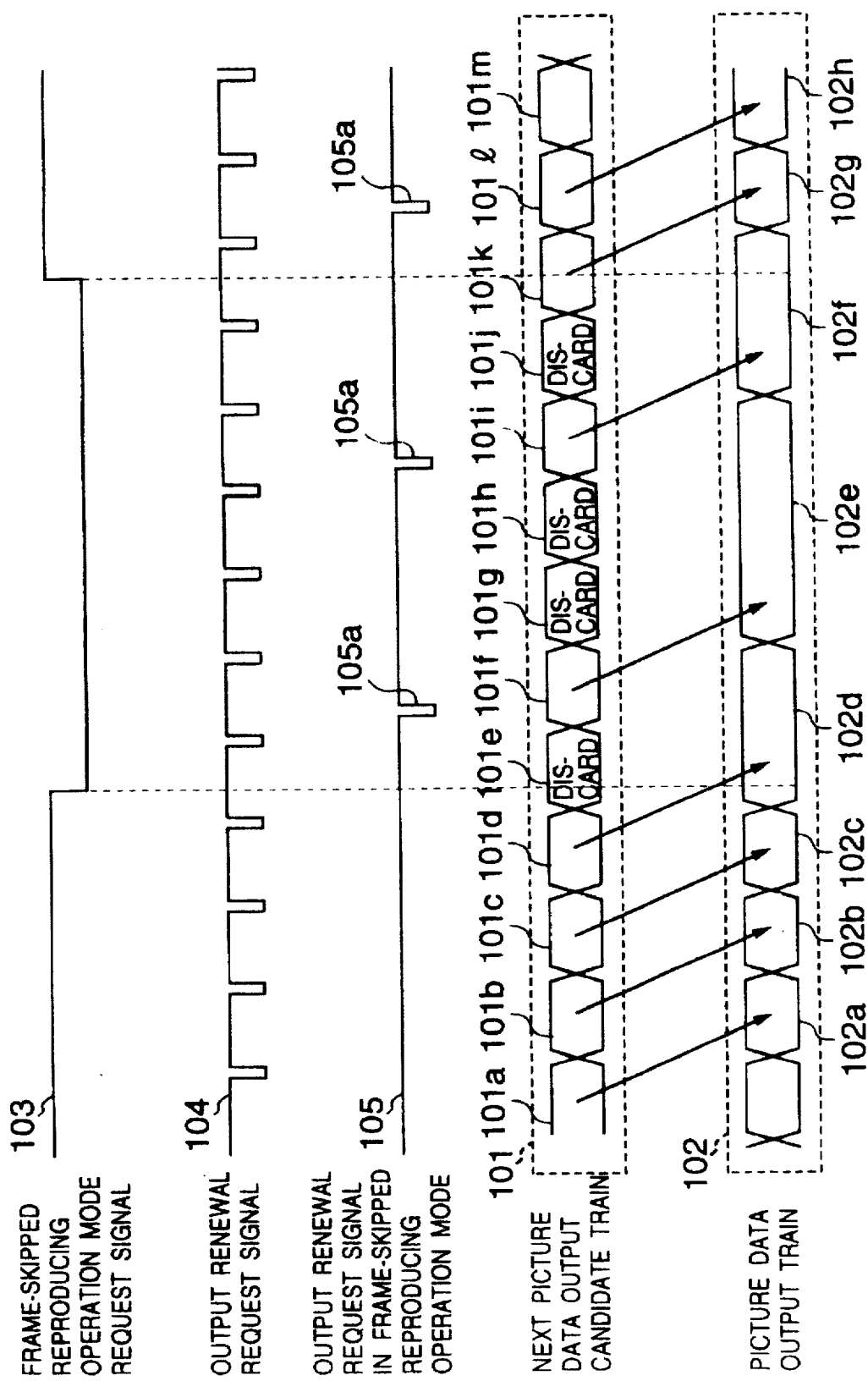
FIG. 1 shows an example of a timing chart illustrating an operation of a video decoding system according to an embodiment of the present invention capable of achieving a frame-skipped reproducing function by using four frame memories.

Hereafter, embodiments of the present invention will be described by referring to the drawings. In the following description, the frame-skipped reproducing function is defined as "function of holding picture data currently being outputted on a screen and still continuing decoding of picture data as well as discarding picture data one after another wherein a picture data under display on the screen is renewed in response to a frame-skipped reproduction request issued at arbitrary intervals". As a representative moving picture decoding apparatus, the MPEG video decoding system is currently well known. Therefore, embodiments will hereafter be described by referring to the case where the present invention is applied to the MPEG video decoding system.

According to the MPEG standard, picture data are coded by using time-based prediction. When decoding picture data, specific picture data included in picture data previously decoded are referred to as occasion demands. Therefore, memory areas for storing a plurality of picture data are needed. These memory areas are hereafter referred to as frame memories. Picture data decoded and stored into the frame memories are held in the frame memories as the next output candidate in accordance with a predetermined order and outputted in synchronism with an output renewal request signal inputted from outside.

Figure 2:
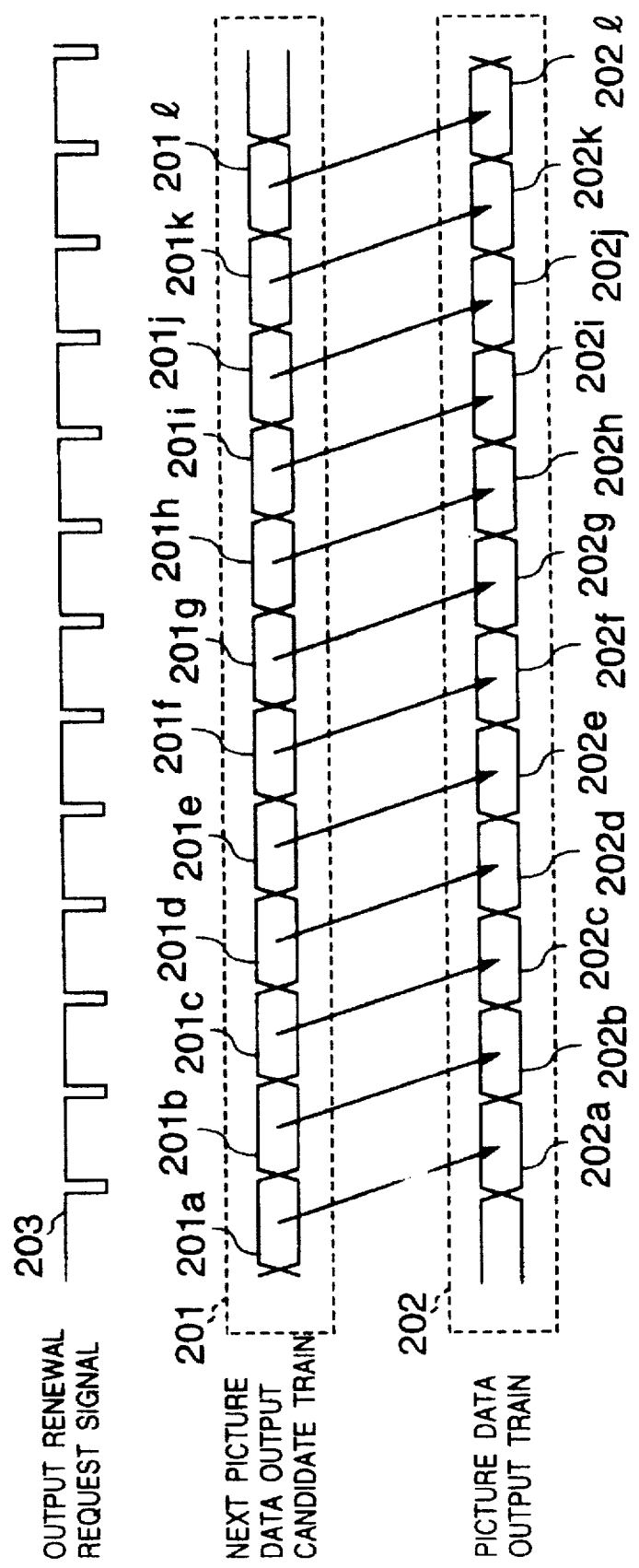
FIG. 2 shows an example of a timing chart illustrating an operation of a video decoding system in a normal reproducing operation mode.

FIG. 1 shows an example of a timing chart used in the case where the frame-skipped reproducing function is implemented in an MPEG video decoding system (hereafter referred to also as MPEG system) using four or more frame memories according to a first embodiment of the present invention. In the present embodiment, an MPEG video decoding system using four frame memories is employed as an example. FIG. 2 shows an example of an output timing chart in the case of a normal reproducing operation mode.

In FIG. 1 showing the timing in the frame-skipped reproducing operation mode (hereafter referred to as "frame-skipped mode" for simplicity), a broken line block 101 represents a train of candidates of decoded picture data to be outputted subsequently. In the block 101, 101a through 101m denote individual output candidates. A broken line block 102 represents an outputted train of decoded picture data. In the block 102, 102a through 102h denote individual output picture data. Numeral 103 denotes a frame-skipped reproducing operation mode request signal (hereafter referred to as "frame-skipped mode request signal" for simplicity). Numeral 104 denotes an output renewal request signal. Numeral 105 denotes an output renewal request signal in the frame-skipped mode. Furthermore, 105a through 105c denote individual output renewal request signal pulses in the frame-skipped mode included in the signal 105.

In FIG. 2 showing timing in the normal reproducing operation mode (hereafter referred to as "normal mode" for simplicity), a broken line block 201 represents a train of candidates of decoded picture data to be outputted subsequently. In the block 201, 201a through 201l denote individual output candidates. A broken line block 202 illustrated under the block 201 represents an outputted train of decoded picture data. In the block 202, 202a through 202h denote individual output picture data. Numeral 203 denotes an output renewal request signal. In examples hereafter described, a time period during which each signal is in a "low" level is defined as active unless otherwise specified.

As shown in FIG. 2, the next output candidate 201 is renewed successively as 201a, 201b, 201c, . . . . Each time the output renewal request signal 203 becomes active, the above described next output candidates 201a, 201b, 201c, . . . are outputted one after another as output picture data 202a, 202b, 202c, . . . .

Operation of the MPEG using four frame memories in the frame-skipped mode will now be described by referring to FIG. 1. Until the frame-skipped mode request signal 103 becomes active (a low level), the next output candidate 101 is renewed successively as 101a, 101b, 101c, . . . in the same way as in the normal mode. Each time the output renewal request signal 104 becomes active, the next output candidate which can be outputted subsequently is outputted as the output 102 in order of 102a, 102b, 102c, . . . If the frame-skipped mode request signal 103 becomes active (a low level), the MPEG system assumes the frame-skipped mode state. That mode is maintained until the signal 103 is removed (i.e., the signal 103 becomes a high level).

If the frame-skipped mode is started, output picture data 102d obtained when the frame-skipped mode request signal 103 was applied is maintained as it is. In the frame-skipped mode as well, the next output candidate train 101 is renewed successively as 101e, 101f, 101g, . . . each time the output renewal request signal 104 becomes active. In the picture data output train 102, however, the next output candiate 101f obtained when the output renewal request signal pulse 105a is inputted becomes effective and is outputted as 102e in the frame-skipped mode. The next output candidate 101e renewed during that time is discarded. Until the next output renewal request signal pulse 105b in the frame-skipped mode is inputted, the output picture data 102e is held. The following candidates 101g and 101h renewed during that time are discarded. When the next output renewal request signal pulse 105b in the frame-skipped mode is inputted, the next output candidate 101i at that time becomes effective and it is outputted as output picture data 102f. The next output candidate 101j renewed while the output picture data 102f is held is discarded.

When the frame-skipped mode request signal 103 is removed, the next output candidate 101k at that time becomes effective and it is outputted as output picture data 102g after the output picture data 102f. Thereafter, the normal mode is restored. When the output renewal request signal 104 is inputted, the next output candidate 101 is renewed successively as 101l, 101m, . . . The picture data output train 102 is renewed in order of 102h, . . . In the present embodiment, timing of output renewal is in synchronism with the output renewal request signal 104 for the normal operation even in the frame-skipped mode. However, timing of output renewal may be in synchronism with the output renewal request signal 105 for the frame-skipped mode.

An example of allocation of the frame memories in the MPEG system having four frame memories will now be described by referring to FIGS. 3A, 3B, 4A and 4B.

Figure 3B:
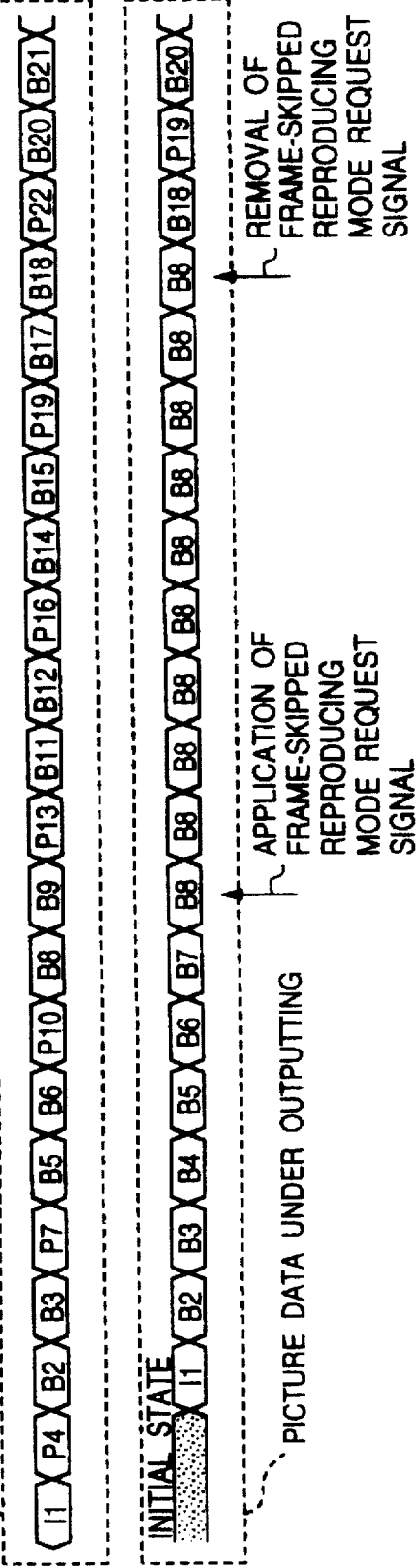
FIG. 3B shows a train of picture data allocated to the frame memories as shown in FIG. 3A for the purpose of decoding and reading (outputting) them.
Figure 4B:
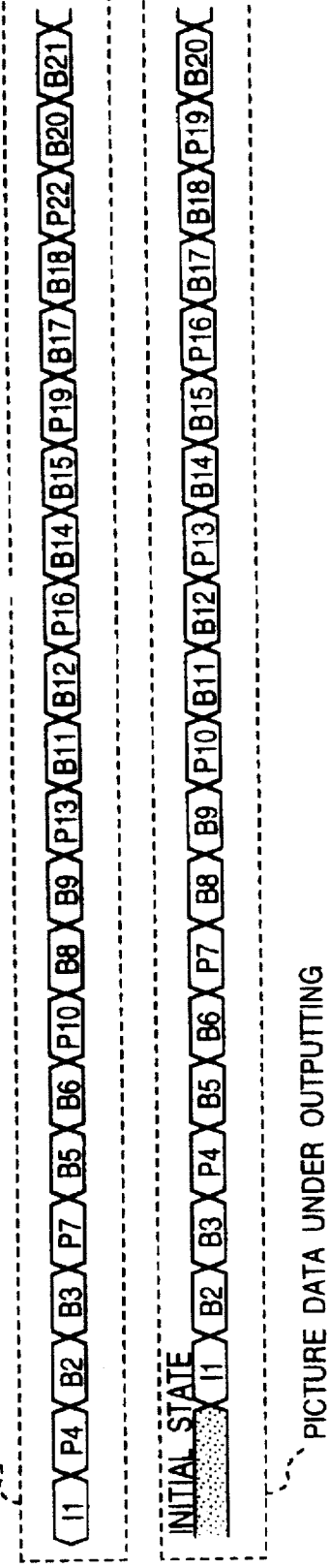
FIG. 4B shows a train of picture data allocated to the frame memories as shown in FIG. 4A for the purpose of decoding and reading (outputting) them.

FIG. 3A shows an example of allocation of frame memories in the frame-skipped mode in an MPEG system using four frame memories. FIG. 3B shows a train of picture data allocated to the frame memories as shown in FIG. 3A for the purpose of decoding and reading (outputting) operations. FIG. 4A shows an example of allocation of frame memories in the normal mode in a system using four frame memories. FIG. 4B shows a train of picture data allocated to the frame memories as shown in FIG. 4A for the purpose of decoding and reading (outputting) operations. In the drawings, 'I', "P" and "B" represent picture types and a numeral following each character represents an output order. A feature of the case of an embodiment where four frame memories are used is that display is started after decoding has been completed.

FIG. 5 shows another example of allocation of frame memories in the frame-skipped mode in the MPEG system using four frame memories. FIG. 5 differs from FIG. 3A in the change-over of reproduction outputs. In FIG. 3A, reproduced output is changed over by change-over between the frame-skipped mode and the normal mode. In FIG. 5, however, output is changed over by applying a request signal for renewing the display in the frame-skipped mode.

In the MPEG video standard, types of coded pictures are classified into the following kinds:

(1) an intra picture (hereafter simply referred to as I-picture) which does not use time-based prediction;

(2) a forwardly predictive picture (hereafter simply referred to as P-picture) which uses forward time-based prediction; and (3) a bidirectionally predictive picture (hereafter simply referred to as B-picture) which uses bidirectional time-based prediction.

Herein, "forward time-based prediction" means prediction of motion based upon a preceding I-picture or P-picture which is to be outputted prior to a picture under decoding, which has an output order nearest to that of the picture under decoding, and which has already been decoded. "Bidirectional time-based prediction" means prediction of motion based upon both the above described preceding I-picture or P-picture and a succeeding I-picture or P-picture which is to be outputted later than the picture under decoding, which has an output order nearest to that of the picture under decoding, and which has already been decoded.

Decoding of an I-picture does not need a reference picture, because it does not use the time-based prediction. Decoding of a P-picture is performed by using, as a reference picture, a preceding picture which is to be outputted prior to the P-picture under decoding, because it uses forward time-based prediction. At this time, a preceding I-picture or P-picture which has already been decoded and which is to be outputted prior to the P-picture under decoding is used as the reference picture. Decoding of a B-picture is performed by using, as reference pictures, both the above described preceding picture and succeeding picture. At this time, a preceding I-picture or P-picture which has already been decoded and which is to be outputted prior to the B-picture under decoding, and a succeeding I-picture or P-picture which has already been decoded and which is to be outputted later than the P-picture under decoding are used as the reference picture. Therefore, a B-picture is a picture which is to be outputted, being inserted between a preceding I-picture or P-picture and a succeeding I-picture or P-picture.

The type of each picture data is judged on the basis of information stored in a portion of inputted picture data called header.

As for allocation of the frame memories FM1 through FM4 in the normal mode shown in FIG. 4A, decoding is performed under the following conditions. (The following control is effected by the controlling section 7k shown in FIG. 6 which will be described later.)

(1) At the time when coded picture data is supplied for its decoding, one of the four frame memories which is empty at that time is allocated for storing decoded picture data.

(2) B-picture data can be outputted when decoding is finished. And the B-picture data is not referred to. If the next output candidate has been prepared when the B-picture is outputted, therefore, the B-picture data is discarded and the next output candidate is outputted in synchronism with the next output renewal request signal.

(3) I-picture data and P-picture data are used as reference picture data. While such picture data is being referred to, it is not discarded. It can be discarded when the next I-picture data or P-picture data which can be referred to has been inputted. And it can be outputted when the above described next I-picture data or P-picture data has been inputted.

In the frame-skipped mode shown in FIG. 3A, a first frame-skipped mode request signal is applied with timing such that B-picture data such as picture data B8 is held in the frame meory FM3. Therefore, the picture data B8 continues to be outputted or read out. Hence, the frame memory FM3 is monopolized by picture data B8 and decoding must be conducted with free three frame memories FM1, FM2 and FM4. B-picture data is not used as reference data. Therefore, if the condition (2) is replaced by a condition "in the frame-skipped mode, B-picture data is discarded when its decoding has been finished," one frame memory suffices for B-picture data. Therefore, by allocating two out of the three remaining frame memories FM1, FM2 and FM4 to I-picture data and P-picture data and allocating the rest one to B-picture data, decoding can be continued. If the frame-skipped mode request signal is removed, then the picture data B8 of the frame memory FM3 which has been continuously outputted until then is discarded, and picture data B18 already decoded and stored in the frame memory FM4 when the frame-skipped mode request signal is removed is then outputted or read out.

The next frame-skipped mode request signal is applied with timing such that P-picture data such as picture data P22 is held in the frame memory FM2. Therefore, the picture data P22 continues to be outputted or read out. Since, the frame memory FM2 is monopolized by the picture data P22, only one frame memory remains unused for I-picture data and P-picture data. This is because two of the four frame memories are allocated for I/P-picture data. From the condition (3), I-picture data and P-picture data are used as reference data and consequently two frame memories are needed for decoding and outputting. In the frame-skipped mode, a frame memory, such as the frame memory FM3, used for decoding and outputting B-picture data heretofore is now used as a frame memory for I-picture data and P-picture data whenever necessary, continuation of decoding and outputting opperations being thus made possible.

By such frame memory allocation, the frame-skipped reproducing function can be realized in the MPEG systems using four frame memories.

Embodiments of the MPEG video decoding system having the above described frame-skipped function will now be described.

Figure 6:
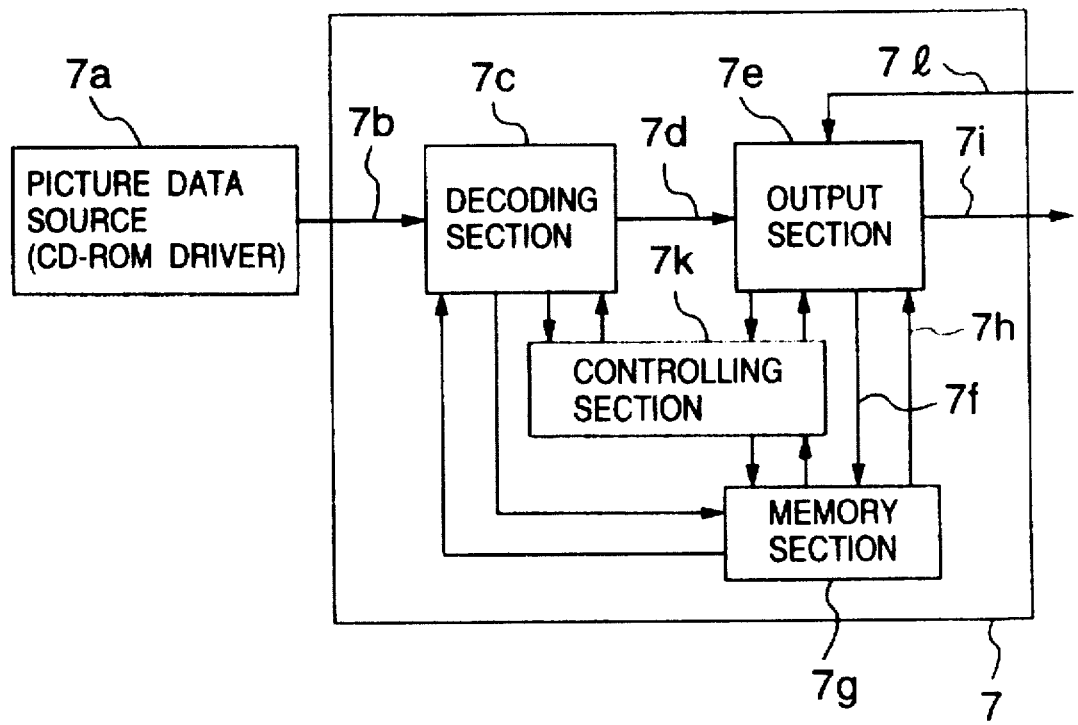
FIG. 6 shows an example of a function block configuration of a video decoding system using four frame memories according to an embodiment of the present invention.

FIG. 6 shows an example of a functional block diagram of an MPEG video decoding system using an external picture data source and four frame memories. In FIG. 6, character 7a denotes an external picture data source such as a CD-ROM driver and a broken line block 7 denotes an MPEG video decoding system. The MPEG video decoding system 7 has a picture data source 7a outside thereof. The MPEG video decoding system 7 includes a decoding section 7c, a memory section 7g, an output section 7e, and a controlling section 7k. The decoding section 7c is supplied with compressed or coded picture data 7b from the picture data source 7a and decodes the compressed picture data successively. The memory section 7g includes a plurality of frame memories for storng picture data obtained in the course of decoding or picture data obtained as a result of decoding. The output section 7e formats the result of decoding and outputs a result of the formatting. The controlling section 7k controls the entire system.

In FIG. 6, character 7b denotes input picture data supplied from the picture data source 7a to the decoding section 7c. Character 7d denotes a memory address of the next output candidate supplied from the decoding section 7c to the output section 7e. Character 7f denotes an address supplied from the output section 7e to the memory section 7g. Character 7h denotes decoded picture data which is supplied from the memory section 7g to the output section 7e. Character 7i denotes output picture data. Character 7l denotes a control signal supplied from the outside (such as the CPU or an operation button), such as an output renewal request signal 5i, a frame-skipped reproducing operation mode request signal 5k, or an output renewal request signal 5h in the frame-skipped reproducing operation mode.

Figure 7:
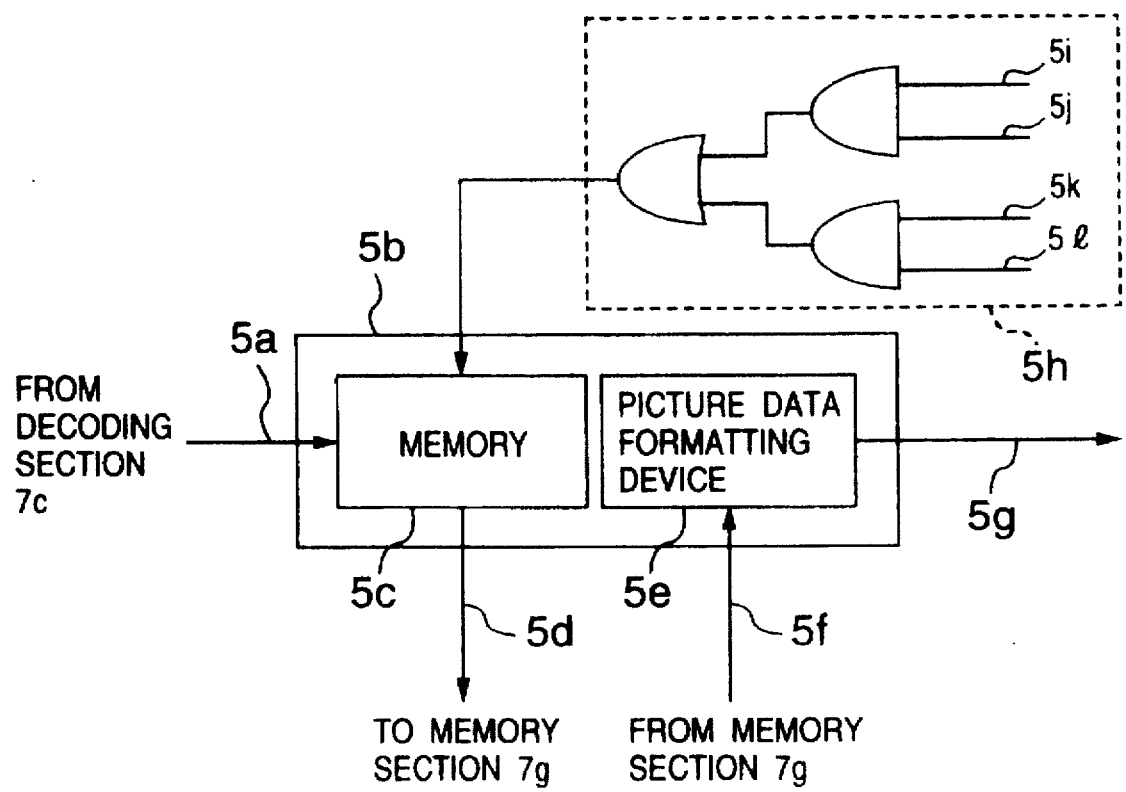
FIG. 7 shows an example of a function block configuration of an output section of a video decoding system using four frame memories according to an embodiment of the present invention.

FIG. 7 shows an example of a functional block diagram of the output section 7e of the MPEG video decoding system using four frame memories according to the first embodiment of the present invention. In FIG. 7, character 5a denotes a memory address of the next output candidate supplied from the decoding section 7c, and 5b denotes a principal part of the output section 7e. The principal part 5b includes a memory 5c and a picture data formatting device 5e. Character 5d denotes an address delivered to the memory section 7g. Character 5f denotes decoded picture data which is transmitted from the memory section 7g. Character 5g denotes output picture data. The formatting device 5e may include a circuit for converting a Y(luminance)/C (color difference signal to an R/G/B signal. A broken line block 5h is a function section added to implement the frame-skipped reproducing function. Character 5i denotes an output renewal request signal, 5j a normal reproducing operation mode signal, 5k a frame-skipped reproducing operation mode request signal, and 5l an output renewal request signal in the frame-skipped reproducing operation mode.

As for the correspondence between the MPEG video decoding system shown in FIG. 6 and FIG. 7, the memory 5c and the picture formatting device 5e are included in the output section 7c shown in FIG. 6, while the broken line block 5h is included in the controlling section 7k shown in FIG. 6. The memory 5c serves to store first frame memory number information indicating a frame memory from which decoded picture data being read is read out for display and second frame memory number information indicating a frame memory from which decoded picture data is to be next read out.

In the present embodiment, there is provided the function section 5h represented by a broken line block in FIG. 7. The function section 5h makes a logical product of the normal reproducing operation mode signal 5j and the control signal 5i for renewing the output in the normal reproducing operation mode and a logical product of the frame-skipped mode request signal 5k and the output renewal request signal 5l in the frame-skipped reproducing operation mode, and then makes a logical sum of those logical products. The function section 5h then supplies its output to the memory 5c included in the principal part 5b of the output section 7e. The memory 5c servers, responsive to the output of the function section 5h, to hold/discard the above-mentioned first and second frame memory number informations. The memory section 7g is responsive to an output of the memory 5c to hold/discard decoded picture data stored in the corresponding frame memories. Thereby, in the normal operation mode, decoded picture data which is to be outputted subsequently is outputted and picture data which is currently being outputted is discarded. On the other hand, in the frame-skipped mode, decoded picture data which is to be outputted subsequently is discarded and picture data which is currently being outputted can be outputted again. Thus, it becomes possible to realize an MPEG video decoding system having such a configuration as to output decoded picture data which is to be outputted subsequently and discard picture data which is currently being outputted. The frame-skipped function section 5h shown in FIG. 7 is a logic circuit for executing logical operation by taking a high level as an active state.

Figure 8:
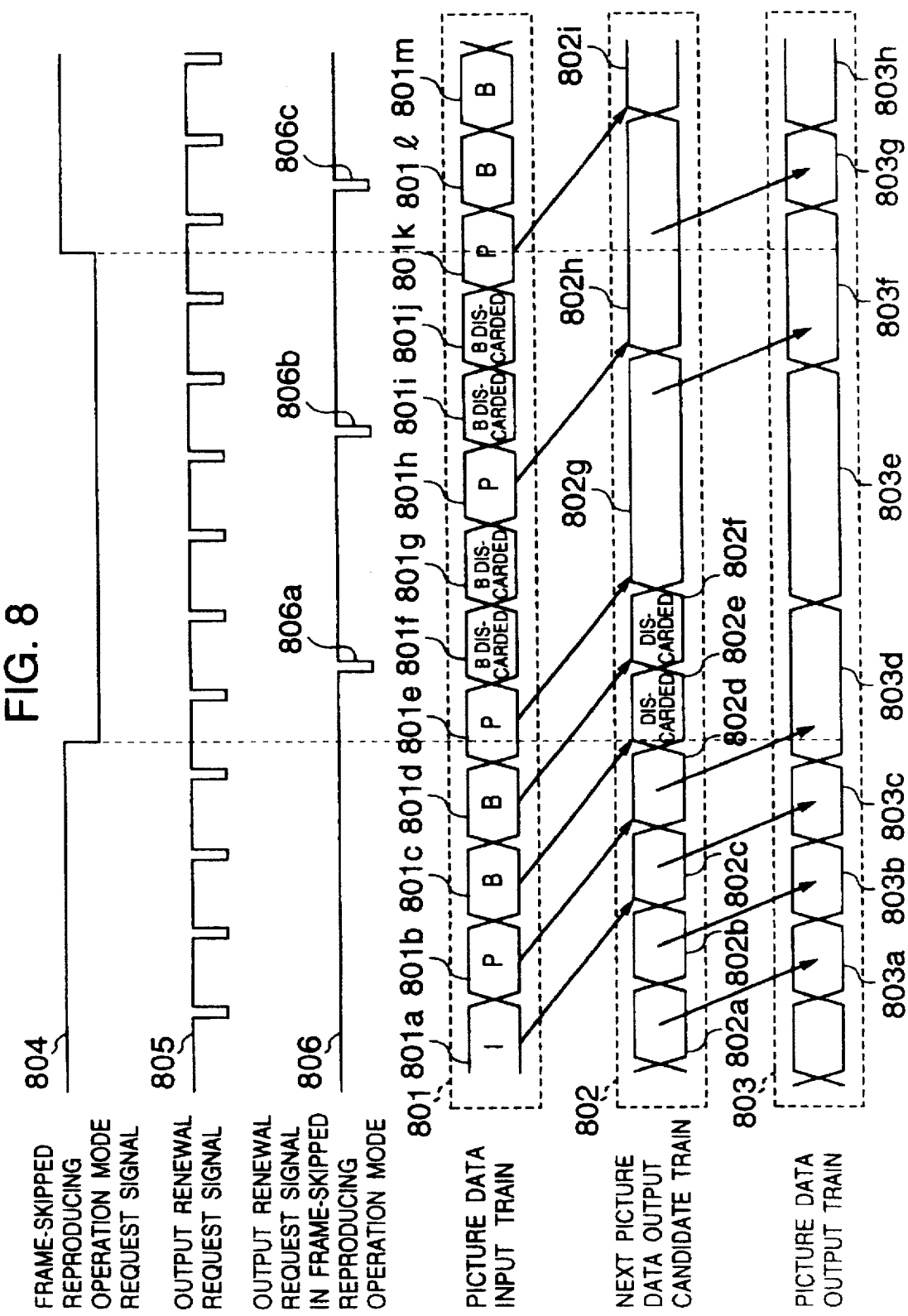
FIG. 8 shows an example of a timing chart illustrating an operation of a video decoding system according to an embodiment of the present invention capable of achieving a frame-skipped reproducing function by using three frame memories.

A second embodiment of the present invention will now be described. FIG. 8 shows an example of a timing chart in the case where the frame-skipped reproducing function is implemented in the output of the MPEG video decoding system having three frame memories.

In FIG. 8, a broken line block 801 represents a picture data train inputted to the three frame memories, and characters 801a through 801m denote individual input picture data. Characters "I," "P," and "B" represent picture types. A broken line block 802 denotes a candidate train of decoded picture data which is to be outputted subsequently, and characters 802a through 802i denote individual output candidates. A broken line block 803 denotes an outputted train of decoded picture data, and 803a through 803h denote individual output picture data. Numeral 804 denotes a frame-skipped mode request signal, and numeral 805 denotes an output renewal request signal. Numeral 806 denotes an output renewal request signal in the frame-skipped mode, and 806a through 806c denote individual output renewal request signal pulses in the frame-skipped mode which are included in the signal 806.

In the frame-skipped mode of the MPEG system using three frame memories, operation is conducted in the same way as the normal mode until the frame-skipped mode request signal 804 becomes active as shown in FIG. 8. The input 801 is supplied in synchronism with a clock in the order of 801a (I), 801b (P), 801c (B), 801d (B) and 801e (P). Each time the output renewal request signal 805 becomes active, the next output candidate 802 is renewed successively as 802a, 802b, 802c, . . . The output 803 is delivered in the order of 803a, 803b, 803c, . . . When the frame-skipped request signal 804 has become active, the MPEG video decoding system assumes the state of a frame-skipped mode. That state is maintained until the signal is removed.

If the apparatus is brought into the frame-skipped mode, output picture data 803e obtained when the frame-skipped mode request signal was inputted is held as it is. When four frame memories are used, continuation of decoding is attained by replacing the condition (2) by the condition "B-picture data should be discarded when decoding has been finished." In the present embodiment using three frame memories, however, B-picture data is not decoded and discarded by adding the condition "B-picture data is not decoded but discarded," continuation of decoding being thus made possible. Therefore, B-picture data of 801f, 801g, 801i and 801j of the input 801 in the frame-skipped mode are not decoded and discarded.

In the frame-skipped mode as well, the next output candidate train 802 is renewed successively as 802e, 802f, 802g, . . . each time the output renewal request signal 805 becomes active. B-picture data 801c and 801d inputted before transition to the frame-skipped mode to which frame memories are once allocated are not decoded and discarded, because the decoding system is already in the frame-skipped mode. The next output candidate 802f at the time when the output renewal request signal pulse 806a is inputted in the frame-skipped mode is discarded because it is B-picture data and hence it is not referred to. In the picture data output train 803, therefore, the previous output picture data 803e is held as it is. In other words, the output picture is not eventually renewed. When the next output renewal request signal pulse 806b in the frame-skipped mode is inputted, the next output candidate 802g at that time becomes effective and output picture data 803f is outputted.

The next output candidate 802h at the time when the frame-skipped mode request signal 103 is removed becomes effective and it is outputted as output picture data 803g after the output picture data 803f. Thereafter, the normal mode is restored. Upon input of the output renewal request signal 805, the next output candidate 802 is renewed successively as 802i, . . . and the picture data output train 803 is renewed in the order of 803h, . . . subsequently to the picture data 803g.

By using the scheme described heretofore, the frame-skipped reproducing function can be realized in the MPEG video decoding system.

With reference to FIGS. 9 and 10, an example of allocation of frame memories FM11, FM12 and FM13 in an MPEG video decoding system using three frame memories will now be described. The order of inputting and decoding picture data is assumed to be the same as that in FIG. 3A. FIG. 9 shows an example of allocation of the frame memories FM11 through FM 13 in the frame-skipped mode in the MPEG video decoding system using three frame memories. FIG. 10 shows an example of allocation of the frame memories FM11 through FM13 in the normal mode in the MPEG video decoding system using three frame memories. In FIGS. 9 and 10, "I," "P," and "B" represent picture types and a numeral following such character represents an outputting order.

As for allocation of the frame memories FM11 through FM13 in the normal mode as shown in FIG. 10, decoding is performed under the conditions (1) through (3) described before with reference to the first embodiment of the present invention. In the MPEG video decoding system having four frame memories, display (i.e., picture data outputting) is commenced after the decoding has been completed. In the MPEG video decoding system having three frame memories, however, two out of the three frame memories FM11 through FM13 are allocated to I-picture data and P-picture data and one remaining frame memory is allocated to B-picture data. In the MPEG video decoding system having three frame memories, therefore, decoded picture data stored in one frame memory is outputted simultaneously with decoding of picture data to which that frame memory is allocated. Accordingly, one frame memory may be accessed simultaneously in some cases.

In FIG. 9, a first frame-skipped mode request signal is applied with timing such that B-picture data as represented by picture data B6 is held in the frame memory FM3. Therefore, B6 continues to be outputted or read out. Accordingly, the frame memory FM13 is monopolized by the picture data B6 and decoding must be conducted with the two remaining frame memories FM11 and FM12. If a condition "picture data judged to be B-type by the controlling section 7k is not decoded and discarded and it is not stored in the memory section in the frame-skipped mode" is added to the condition (2), then a frame memory for B-picture data becomes unnecessary and two remaining frame memories FM11 and FM12 can be allocated to I-picture data and P-picture data, thereby continuation of decoding being thus made possible. When the frame-skipped mode request signal is removed, the picture data B6 of the frame memory FM3 which has been outputted continuously until then is discarded and decoded picture data P19 stored in the frame memory FM11 is outputted or read out subsequently.

The next frame-skipped mode request signal is inputted at with timing such that P-picture data as represented by picture data P22 is held in the frame memory FM12. Therefore, the picture data P22 continues to be outputted or read out. Accordingly, the frame memory FM12 is monopolized by the picture data P22 and only the frame memory FM11 is used for the I-picture data and P-picture data. On the other hand, from the condition (3), I-picture data and P-picture data are used as reference data, and two frame memories are required for their decoding and outputting. Therefore, the frame memory, such as the frame memory FM13, which has been used for storing and outputting decoded B-picture data in the normal mode is now used as a frame memory for I-picture data and P-picture data in the frame-skipped mode. Accordingly, since no frame memory is left for B-picture data, by discarding B-picture data without decoding them, decoding I-picture data and P-picture data can be continued.

When the frame-skipped mode request signal is removed, the picture data P22 of the frame memory FM12 which has been outputted continuously until then is discarded and then decoded picture data P34 stored in the frame memory FM13 is outputted or read out. The frame memory FM12 which has continued to output the picture data P22 until then can be used for storing and outputting decoded picture data. Therefore, the frame memory FM12 is used as a frame memory for B-picture data. By conducting such frame memory allocation and adopting a configuration in which frame memories are not fixed for normal usage and reference usage, the frame-skipped mode can be realized.

Figure 11:
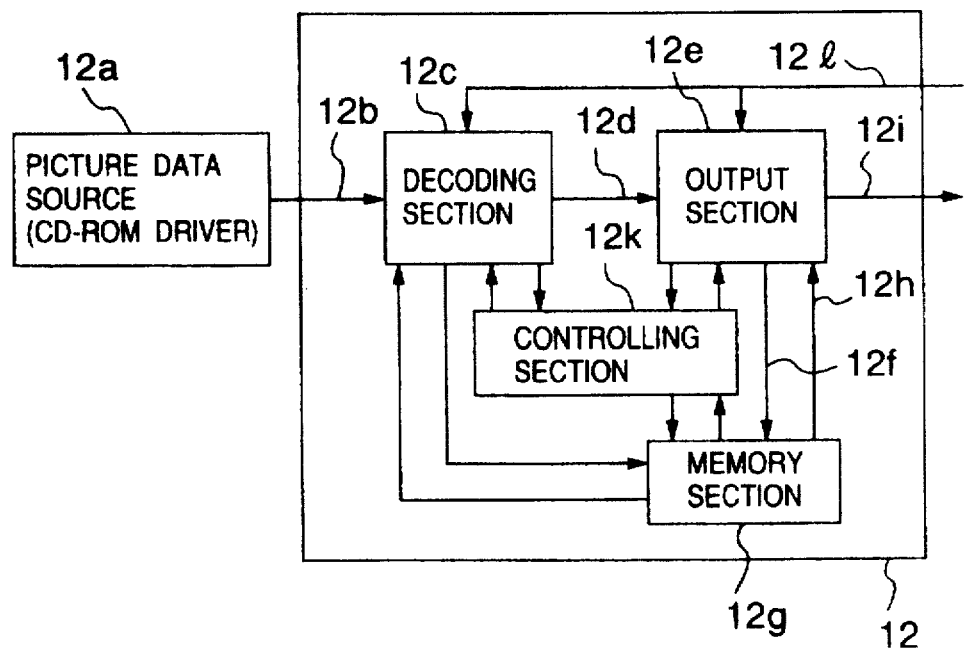
FIG. 11 shows an example of a function block configuration of a video decoding system using three frame memories according to an embodiment of the present invention.

FIG. 11 shows an example of a functional block diagram of an MPEG video decoding system using an external piture data source and three frame memories. In FIG. 11, character 12a denotes an external picture data source and a broken line block 12 is an MPEG video decoding system.

The MPEG video decoding system 12 of FIG. 11 has a picture data source 12a outside thereof. The MPEG video decoding system 12 includes a decoding section 12c, a memory section 12g, an output section 12e, and a controlling section 12k. The decoding section 12c is supplied with compressed picture data 12b from the picture data source 12a and decodes the compressed picture data successively. The memory section 12g stores picture data obtained in the course of decoding or picture data obtained as a result of decoding. The output section 12e formats the result of decoding and outputs a result of the formatting. The controlling section 12k controls the entire system. In the functional block diagram of the MPEG video decoding system using four frame memories as shown in FIG. 6, the control signal 7l is inputted to only the output section 7e. In the MPEG video decoding system of FIG. 11 using three frame memories, however, the condition "B-picture data are not decoded and discarded and they are not stored in the memory section" is added and consequently a control signal 12l is inputted to the decoding section 12c and the output section 12e.

In FIG. 11, character 12b denotes input picture data supplied from the picture data source 12a to the decoding section 12c. Character 12d denotes a memory address of the next output candidate supplied from the decoding section 12c to the output section 12e. Character 12f denotes an address supplied from the output section 12e to the memory section 12g. Character 12h denotes picture data supplied from the memory section to the output section 12e. Character 12i denotes output picture data. Character 12l denotes a control signal supplied from the outside, such as an output renewal request signal, a frame-skipped reproducing operation mode request signal, or an output renewal request signal in the frame-skipped reproducing operation mode.

Figure 12:
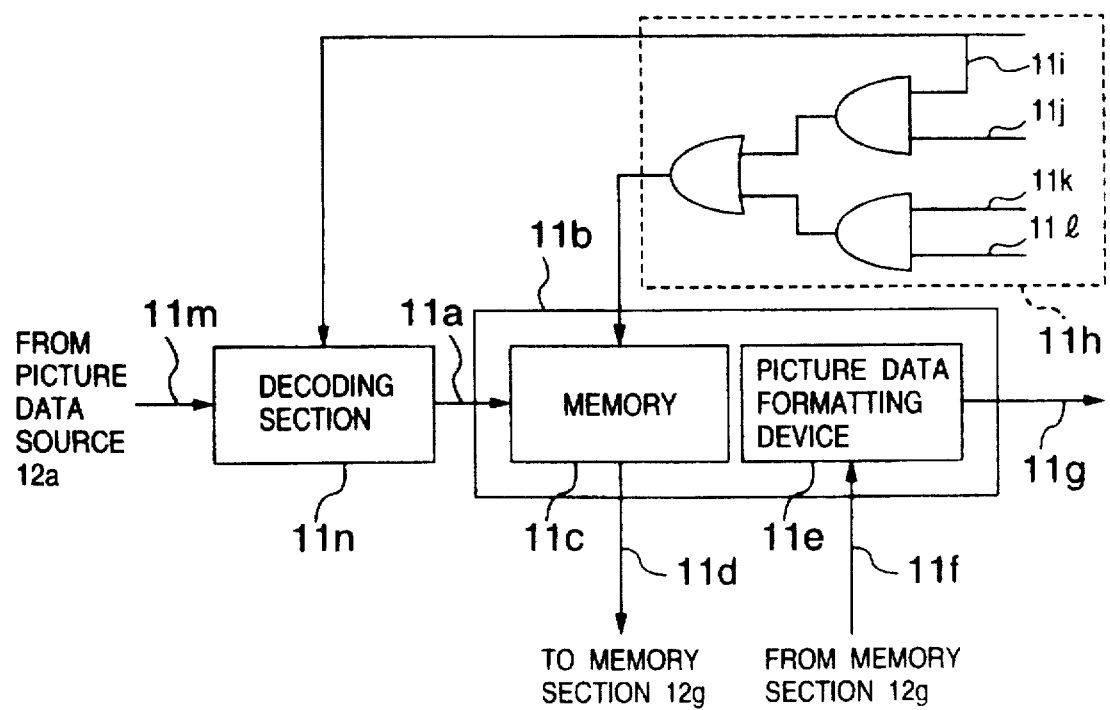
FIG. 12 shows an example of a function block configuration of an output section and an example of a function block configuration of a decoding section of a video decoding system using three frame memories according to an embodiment of the present invention.

FIG. 12 shows an example of a functional block diagram of the output section and the decoding section of the MPEG video decoding system using three frame memories according to the second embodiment of the present invention. In FIG. 12, character 11a denotes a memory address of the next output candidate supplied from the decoding section 11n, and 11b denotes a principal part of the output section 12e. The principal part 11b includes a memory 11c and a picture data formatting device 11e. Character 11d denotes an address delivered to the memory section 12g. Character 11f denotes decoded picture data which is transmitted from the memory section 12g. Character 11g denotes output picture data. The formatting device 11e may include a circuit for converting a Y(luminance)/C (color difference signal to an R/G/B signal. A broken line block 11h is a function section added to implement the frame-skipped reproducing function. Character 11i denotes an output renewal request signal, 11j a normal reproducing operation mode signal, 11k a frame-skipped reproducing operation mode request signal, 11l an output renewal request signal in the frame-skipped reproducing operation mode, and 11m (coded) input picture data which has not been decoded yet. The memory 11c serves to store first frame memory number information indicating a fame memory from which decoded picture data is being read out for display and second frame memory number information indicating a frame memory from which decoded picture data is to be next read out.

There is provided the function section 11h represented by a broken line block in FIG. 12. The function section 11h makes a logical product of the normal reproducing operation mode signal 11j and the control signal 11i for renewing the output in the normal reproducing operation mode and a logical product of the frame-skipped mode request sinal 11k and the output renewal request signal 11l in the frame-skipped reproducing operation mode, and then makes a logical sum of those logical products. The function section 11h then supplies its output to the memory 11c included in the principal part 11b of the output section 12e. At the same time, the function section 11h supplies the output renewal request signal 11i to the decoding section 11n. The memory 11c serves, responsive to the output of the function section 11h, to hold/discard the above-mentioned first and second frame memory number informations. The memory section 12g is responsive to an output of the memory 11c to hold/discard decoded picture data stored in the corresponding frame memories. Thereby, in the normal operation mode, decoded picture data which is to be outputted subsequently is outputted and picture data which is currently being outputted is discarded. On the other hand, in the frame-skipped mode, decoded picture data which is to be outputted subsequently is discarded and picture data which is currently being outputted is outputted again. Thus, it becomes possible to realize an MPEG video decoding system having such a configuration as to output decoded picture data which is to be outputted subsequently and discard picture data which is currently being outputted, according to the control signal 11i for renewing picture data in the frame-skipped mode.

Figure 13:
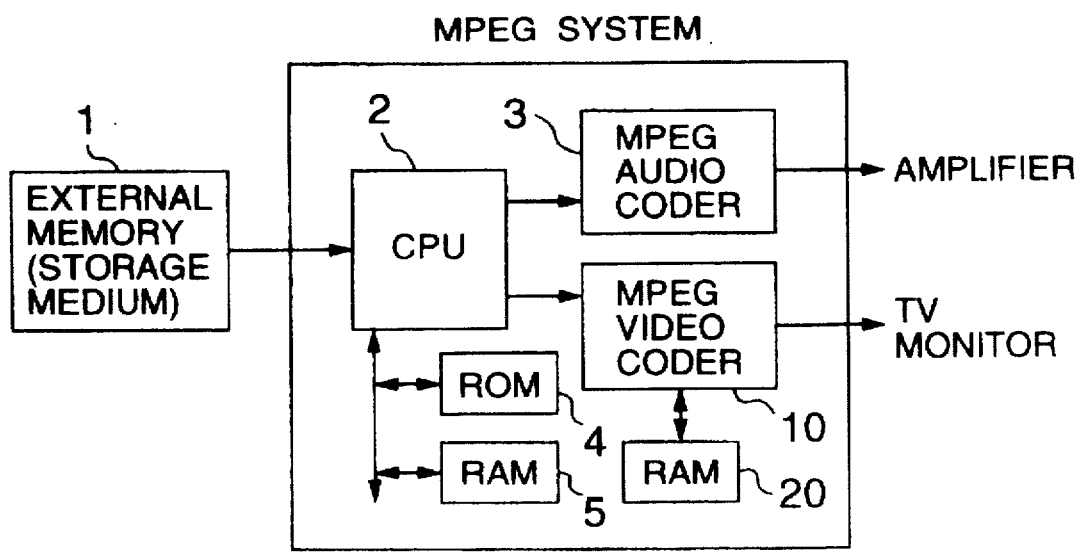
FIG. 13 is a block diagram showing a moving picture reproducing system using an MPEG video decoder for decoding coded moving pictures to which the present invention may be applied.

FIG. 13 shows a moving picture reproducing system capable of using an MPEG video decoder (moving picture decoding apparatus) of the above described various embodiments for decoding coded moving pictures. FIG. 14 shows an example of configuration of an MPEG video decoder 10 of the system shown in FIG. 13. Although not especially restrictred, circuit blocks surrounded by a dotted line A in FIG. 14 may be formed on one semiconductor substrate such as silicon substrate to be in an IC form.

As shown in FIG. 13, the moving picture reproducing system includes an external memory device 1 for reading out compressed, coded moving picture data stored in a storage medium such as a CD-ROM, a microcomputer 2 for separating picture data, voice data, and control information from data which are read out and decoding control information, an MPEG audio decoder 3 for decoding separated voice data, and an MPEG video decoder 10 for decoding separated moving picture data. The decoded moving picture signal is sent to a monitor such as a CRT display device. The decoded voice signal is sent to an audio amplifier.

Numeral 4 denotes a read only memory for storing a program executed by the microcomputer 2 and fixed data. Numeral 5 denotes a random access memory for providing a working area of the microcomputer 2. Numeral 20 denotes a buffer memory connected to the MPEG video decoder 10 to temporarily holding coded picture data.

As shown in FIG. 14, the MPEG video decoder 10 includes a variable length decoder 11, an inverse cosine transformation circuit 12, a motion compensation circuit 13, a buffer control circuit 14, an output circuit 15, and an internal control circuit 16. The variable length decoder 11 is capable of decoding picture data having an arbitrary length (an arbitrary number of bits) supplied from the CPU 2. The inverse cosine transformation circuit 12 performs inverse cosine transformation on picture data compressed in frequency component (subjected to discrete cosine transformation) and converts the picture data to original picture data. The motion compensation circuit 13 converts pictures as occasion demands from preceding picture data or from preceding and succeeding picture data in accordance with whether picture data supplied from the transformation circuit 12 are I-picture data, P-picture data or B-picture data. The buffer control circuit 14 stores the converted (motion-compensated) picture data in an external buffer memory 20 and reads out the converted (motion-compensated) picture data as occasion demands. The output circuit 15 generates and outputs picture signals such as RGB signals on the basis of decoded picture data. The internal control circuit 16 generates a plurality of control signals $\phi 1$, $\phi 2$, $\phi 3$, $\phi 4$ and $\phi 5$ for sequentially controlling the above described circuits and causes picture data to be decoded in accordance with a predetermined algorithm. The internal control circuit 16 has a clock generator 17. By using a clock generated by the clock generator 17 as a reference, the internal control circuit 16 produces the above described control signals. The buffer memory 20 can be formed by using a general purpose DRAM (dynamic random access memory), for example. Alternately, this buffer memory 20 may be incorporated into the MPEG video decoder to implement the whole as a single chip.

The members shown in FIG. 14 generally correspond to those shown in FIGS. 6 or FIG. 11 as follows.

The control circuit 16 of FIG. 14 corresponds to the controlling section (7k, 12k) shown in FIGS. 6 or 11. The decoder 11, transformation circuit 12 and motion compensation circuit 13 of FIG. 14 constitute the decoding section (7c, 12c) shown in FIGS. 6 or 11. The buffer control circuit 14 and buffer memory 20 of FIG. 14 constitute the memory section (7g, 12g) shown in FIGS. 6 or 11. The output circuit 15 of FIG. 14 corresponds to the output section (7e, 12e) shown in FIGS. 6 or 11.

An example of frame memory selection means for realizing the frame-skipped reproducing function will now be described.

Figure 15:
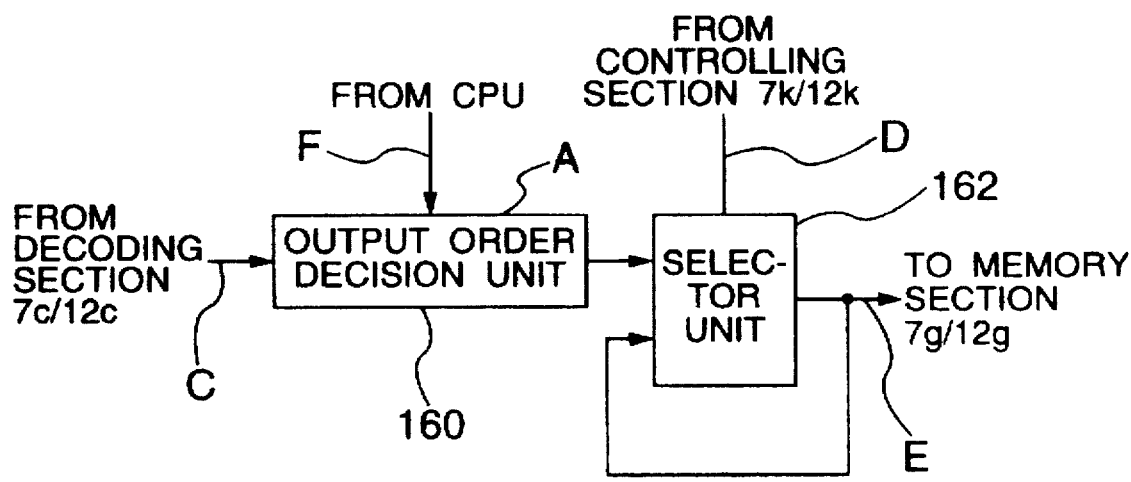
FIG. 15 shows an example of a frame memory selecting circuit included in the controlling section shown in FIG. 6 or FIG. 12.

FIG. 15 shows an example of a structure of means for selecting a frame memory from which decoded picture data is to be read out for display. The illustrated structure may be used in common to the case where three frame memories are used and the case where four frame memories are used. This frame memory selection means is included in the controlling section 7k of FIG. 6 or the controlling section 12k of FIG. 12.

In FIG. 15, numeral 160 denotes an output order decision unit responsive to information C supplied from the decoding section 7c/12c as described later to select a frame memory which should output its content subsequently. Numeral 162 denotes a selector unit receiving an output of the output order decision unit 160 and an output of itself and serving to deliver either one of the two inputs. The output of the selector unit 162 is sent to the memory section (7g/12g) as information specifying a frame memory which should output its content subsequently. A control signal D to the selector unit 162 is supplied from the controlling section (7k/12k) as a reproducing operation mode changeover signal.

The output order decision unit 160 receives information C concerning an order of input picture data decoding supplied from the decoding section (7c/12c). Besides the decoding order, the information C contains the type of decoded picture data and a frame memory number storing that picture data. On the basis of those information pieces, the output order decision unit 160 outputs a frame memory number which should output its content subsequently. Upon receiving an output renewal request signal F from the CPU, for example, the output order decision unit 160 renews its output in synchronism with the signal F.

The selector unit 162 outputs one of the inputs thereto specified by the reproducing operation mode changeover signal D, as an output frame memory number E. The changeover signal D represents whether the reproducing operation mode is the normal mode or the frame-skipped mode. In the case of the normal mode, the selector unit 162 outputs the output of the decision unit 160 as the output frame memory number E. In the case of the frame-skipped mode, the selector unit 162 outputs an input equivalent to the output of itself as it is, as the output frame memory number E.

The output frame memory number E is sent to the memory section (7g/12g) and the controlling section (7k/12k).

Such frame memory selection means is provided in the controlling section. If transition to the frame-skipped mode is requested, therefore, the content of the frame memory which has been outputted at that time is held as it is. During a time period of the frame-skipped mode as well, the number of the frame memory which should originally output picture data continues to be renewed. Upon removal of the frame-skipped mode request, therefore, the content of the frame memory which should be originally outputted can be outputted subsequently.

Figure 16:
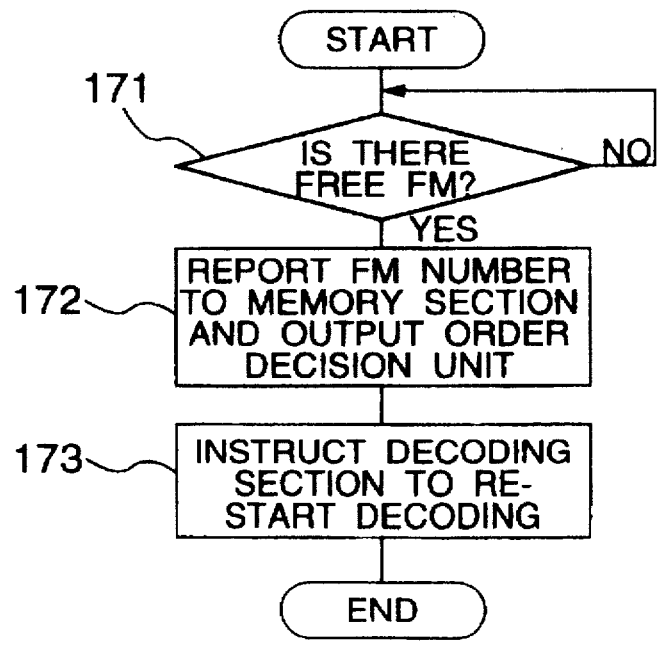
FIG. 16 is a flow chart showing memory allocation steps to be executed by the controlling section.

FIG. 16 shows processing steps of frame memory allocation to be used for picture data decoding in the case where four frame memories are used. When this is to be implemented in the controlling section 7k, it may be implemented by software of a microcomputer or a circuit implementing this processing steps may be formed by using a logic circuit.

In FIG. 16, "FM" means one frame memory.

This processing is started when the decoding section 7c detects a head of new picture data in picture data inputted thereto and the fact is reported to the controlling section 7k. Upon detection of a head of new picture data, the decoding section reports the type of that picture data to the controlling section 7k and assumes a temporary waiting state.

Upon being reported, the controlling section 7k starts this processing or actuates a circuit implementing this processing. At step 171, search is performed to check whether there is a frame memory not yet used. More specifically, the controlling section 7k may have therein information concerning the number of the frame memory currently in use. A number of a frame memory which is currently used as the frame memory for storing reference picture data, a number of a frame memory which stores picture data currently being outputted for display, and a number of a frame memory which stores decoded picture data not yet outputted are stored. If a frame memory which does not correspond to them exists, then that frame is judged to be usable and determined to be a frame memory for storing decoded picture data.

If all frame memories are in the unusable state, then the step 171 is executed repetitively until a usable frame memory appears, for example until a frame memory currently outputting picture data has completely outputted picture data.

If a free frame memory is found, then control is transferred to step 172, and a number of the frame memory to be allocated for storing decoded picture data is reported to the memory section 7g and the output order decision unit 160. Subsequently at step 173, the decoding section in the waiting state is instructed to re-start decoding and this processing is finished.

Figure 17:
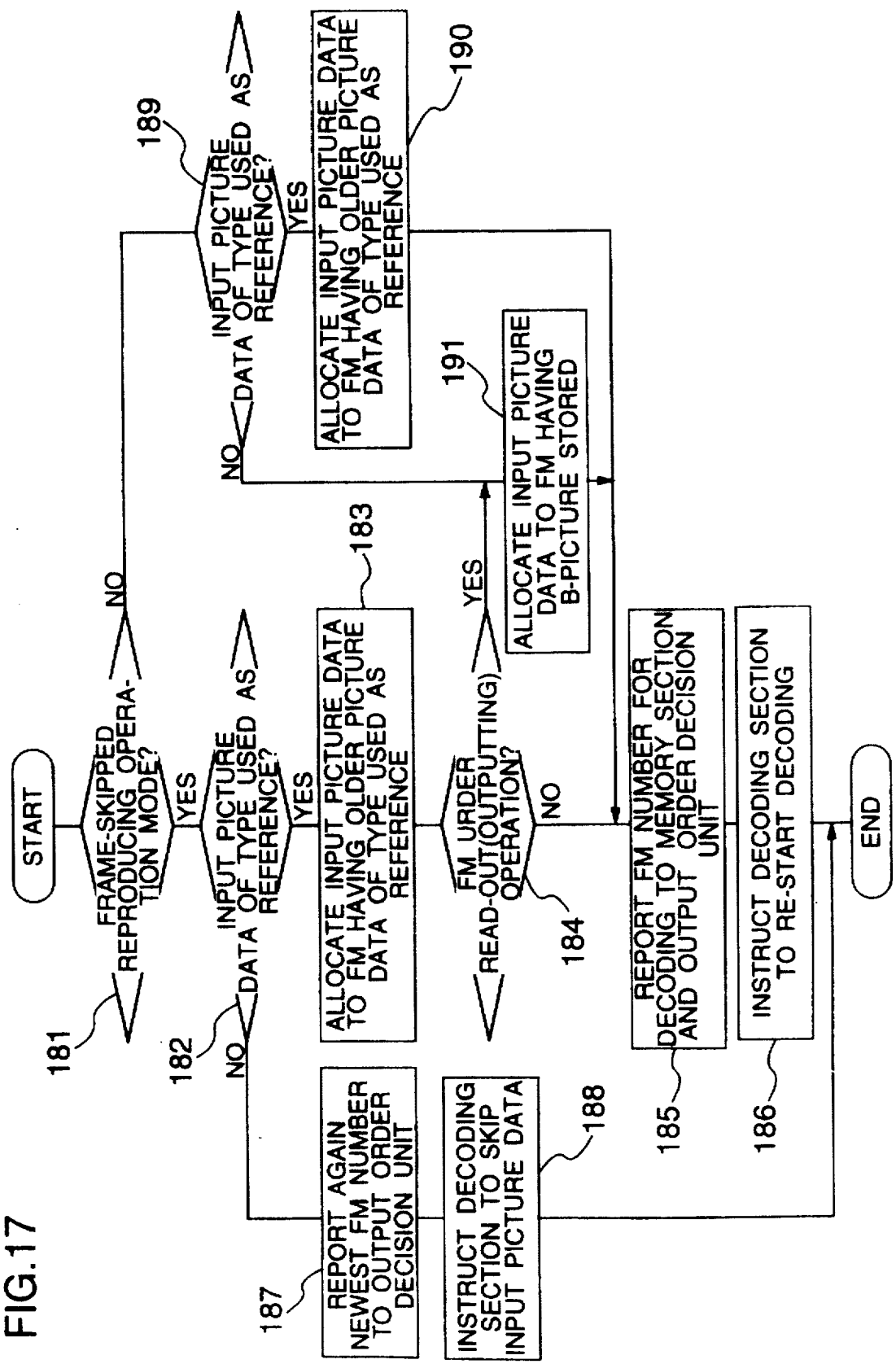
FIG. 17 is another flow chart showing memory allocation steps to be executed by the controlling section.

FIG. 17 shows an example of processing steps of decoding frame memory allocation in the case where the number of frame memories is three in the normal mode and the frame-skipped mode. In the same way as the example shown in FIG. 16, the present example may be implemented by software in a microcomputer or may be implemented by using a logic circuit.

In FIG. 17 as well, "FM" means frame memory.

This processing is started when a head of new picture data is detected in input picture data by the decoding section 12c and the fact is reported to the controlling section. During that time, the decoding section assumes the temporary waiting state.

Upon this report, the controlling section 12k starts the processing shown in FIG. 17 or actuates a circuit executing this processing.

First of all, it is judged at step 181 whether the reproducing operation mode is the normal mode or the frame-skipped mode. In the case of the frame-skipped mode, the control is transferred to step 182. In the case of the normal mode, the control is transferred to step 189. In the case of the normal mode, the type of picture data is discriminated at step 189. In case of picture data of type used as reference picture data, the control is transferred to step 190. In case of picture data of type which is not used as reference picture data, the control is transferred to step 191.

If the picture data is judged at step 189 to be of type used as reference picture data and the control is transferred to step 190, then the older reference picture data among reference picture data which are currently stored in frame memories becomes unnecessary and consequently that frame memory which stores the older reference picture data is used to decode picture data of type used as new reference picture data. Then the control is transferred to step 185, and a number of the new frame memory for decoding is reported to the memory section 12g and the output order decision unit 160.

Thereafter, the control is transferred to step 186. At step 186, the decoding section in the waiting state is instructed to re-start decoding.

If the picture data is judged at step 189 to be unusable as reference picture data, i.e., to be B-picture data, the control is transferred to step 191. At step 191, a frame memory already allocated to previous B-picture data at that time is allocated to decoding of new B-picture data and the control is transferred to step 185.

If the mode is judged at step 181 to be the frame-skipped mode, then the control is transferred to step 182. At step 182, it is determined whether new picture data is of the type used as reference picture data. If the new picture data is judged at step 182 to be of the type used as reference picture data, then the control is transferred to step 183. At step 183, the frame memory in which older reference picture data already existing in the frame memories at that time is stored is tentatively allocated as a frame memory for decoding.

Subsequently at step 184, it is determined whether that frame memory is being used for read-out operation at that time. If the frame memory is being used as a frame memory for a read-out operation, the control is transferred to step 191. If the frame memory is not being used for a read-out operation, then the frame memory tentatively assigned is decided to be an actual frame memory for decoding, and the control is tranferred to step 185.

If the picture data is judged at step 182 to be B-picture data which is not used as reference picture data, the control is transferred to step 187. For B-picture data, decoding is canceled. The frame memory number reported lastly is reported to the output order decision unit 160 again to prevent the order from being disturbed. And at step 188, the decoding section is instructed to skip that picture data without decoding it.

The present example is merely an example. Implementation using other methods is also possible.

While the invention made by the present inventors has heretofore been described specifically by referring to embodiments, the present invention is not limited to the above described embodiments. It is a matter of course that various modifications may be made without departing from the spirit of the present invention.

As heretofore described in detail, each of the above described embodiments makes it possible to realize a frame-skipped reproducing function according to a request fed from the outside, by adding, to an output section of a conventional MPEG video descoring system, an extremely simple circuit to derive a logical sum of a control signal for outputting picture data which is to be outputted and a control signal for renewing the output in a selected mode.

We claim:

1. In a moving picture decoding apparatus having memory areas for storing four decoded picture data each corresponding to one frame, said moving picture decoding apparatus decoding a coded picture data train carrying moving picture information and outputting the decoded picture data train by using said memory area, a moving picture decoding method capable of a frame-skipped reproducing operation comprising the steps of:

in a predetermined mode, outputting again decoded picture data being outputted and discarding picture data already decoded and scheduled to be outputted subsequently; and in said predetermined mode, in response to a control signal for renewing output appearing in said predetermined mode, outputting picture data already decoded and scheduled to be outputted subsequently and discarding outputted picture data.

2. A moving picture decoding apparatus for decoding coded input moving picture data and outputting the decoded moving picture data, said moving picture decoding apparatus being capable of conducting frame-skipped reproducing operation, said moving picture decoding apparatus including a decoding section for decoding coded picture data successively by referring to decoded picture data, a memory section having memory areas for storing four decoded picture data each corresponding to one frame, an output section for outputting decoded picture data, and a controlling section for controlling said moving picture decoding apparatus as a whole, said controlling section comprising:

means for outputting a predetermined control signal in a predetermined mode, and thereby outputting again decoded picture data outputted from said memory area in said predetermined mode and discarding decoded picture data stored in said memory area and scheduled to be outputted subsequently; and means responsive, in said predetermined mode, to a control signal for renewing an output in said predetermined mode, for outputting, from said memory area, decoded picture data scheduled to be outputted subsequently and discarding outputted picture data from said memory areas.

3. A moving picture decoding apparatus for decoding coded input moving picture data and outputting the decoded moving picture data, said moving picture decoding apparatus being capable of conducting a frame-skipped reproducing operation, said moving picture decoding apparatus comprising a decoding section for decoding coded picture data successively by referring to decoded picture data, a memory section having memory areas for storing four decoded picture data each corresponding to one frame, an output section for outputting decoded picture data, and a controlling section for controlling said moving picture decoding apparatus as a whole, wherein:

said output section includes a memory for storing a number of a memory area currently outputting picture data and a number of a memory area scheduled to output picture data subsequently, said memory being responsive to application of a control signal effective in a predetermined mode and a control signal in a mode other than said predetermined mode, for holding and discarding numbers of memory areas of said memory as required and outputting a result thereof; and said memory section is responsive to an output of said memory to output and discard decoded picture data stored in memory areas.

4. In a moving picture decoding apparatus having memory areas for storing three decoded picture data each corresponding to one frame, said moving picture decoding apparatus decoding a coded picture data train carrying moving picture information and outputting the decoded picture data train by using said memory areas, a moving picture decoding method capable of frame-skipped reproducing operation comprising the steps of:

discarding picture data other than picture data used for reference without decoding said picture data;

in a predetermined mode, outputting again decoded picture data being outputted when output is to be renewed; and in response to a control signal for renewing output appearing in said predetermined mode, outputting picture data already decoded and scheduled to be outputted subsequently and discarding picture data being outputted at that time.

5. A moving picture decoding apparatus for decoding coded input moving picture data and outputting the decoded moving picture data, said moving picture decoding apparatus being capable of conducting a frame-skipped reproducing operation, said moving picture decoding apparatus comprising a decoding section for decoding coded picture data successively by referring to decoded picture data, a memory section having memory areas for storing three decoded picture data each corresponding to one frame, an output section for outputting decoded picture data, and a controlling section for controlling said moving picture decoding apparatus as a whole, wherein:

said output section includes a memory for storing a number of a memory area currently outputting picture data and a number of a memory area scheduled to output picture data subsequently, said memory being responsive to application of a control signal effective in a predetermined mode and a control signal in a mode other than said predetermined mode, for holding and discarding numbers of memory areas of said memory as required and outputting a result thereof;

said memory section is responsive to an output of said memory to output and discard decoded picture data stored in memory areas; and said decoding section is responsive to application of said control signal effective in a predetermined mode, for discarding input picture data unusable as reference picture data without decoding said input picture data.

6. An apparatus for decoding an input train of coded picture data carrying moving picture information and for outputting a train of picture data thus decoded, said apparatus having a frame-skipped reproducing function, said input train of coded picture data containing picture data of type used as reference for decoding other picture data and picture data of type not used as reference for decoding other picture data, said apparatus comprising:

a controlling section;

a memory section;

a decoding section for decoding said picture data input train under control of said controlling section, said memory section storing picture data decoded by said decoding section and holding said picture data for a first time interval under control of said controlling section; and an output section responsive to a frame-skipped reproducing request signal supplied from outside, for outputting at least one decoded picture data from said memory section continuously for a second time interval, said first and second time intervals depending upon said frame-skipped reproducing request signal.

7. An apparatus according to claim 6, wherein:

said apparatus is in the normal reproducing operation mode when said apparatus is not receiving said frame-skipped reproducing request signal supplied from the outside, and said apparatus is in the frame-skipped reproducing operation mode when said apparatus is receiving said frame-skipped reproducing request signal;

said controlling section includes a device for determining whether said input picture data is picture data of a first type used as reference for decoding other picture data or picture data of a second type which is not used as reference for decoding other picture data; and said memory section has four memory areas each capable of storing one picture data corresponding to one frame, said controlling section further including means for controlling said decoding section and said memory section in the normal reproducing operation mode and the frame-skipped reproducing operation mode, so that decoding of input picture data conducted by said decoding section by using said memory section and readout of decoded picture data from said memory section are simultaneously executed by using different memory areas, and means, responsive to output of said device for determining the type of input picture data, for controlling said memory section, so that for decoded picture data which is obtained by decoding input picture data of said first type for storage in one of said four memory areas and which is not outputted continuously for said second time interval, said first time interval during which said decoded picture data of the first type is held in said one memory area in the normal reproducing operation mode and the frame-skipped reproducing operation mode is defined as a time interval lasting from completion of said decoding until after a time point when another input picture data of the first type inputted after said input picture data of the first type is decoded for storage in one of said four memory areas, and for decoded picture data which is obtained by decoding input picture data of said second type for storage in one of said four memory areas and which is not outputted continuously for said second time interval, said first time interval during which said decoded picture data of the second type is held in said one memory area in the normal reproducing operation mode is defined as a time interval lasting from completion of said decoding until a time point when said decoded picture data of the second type is read out from said one memory area, and said first time interval during which said decoded picture data of the second type is held in said one memory area in the frame-skipped reproducing operation mode is defined as a time interval lasting from completion of said decoding until a time point before said decoded picture data of the second type is read out.

8. An apparatus according to claim 6, wherein:

said apparatus is in the normal reproducing operation mode when said apparatus is not receiving said frame-skipped reproducing request signal supplied from the outside, and said apparatus is in the frame-skipped reproducing operation mode when said apparatus is receiving said frame-skipped reproducing request signal;

said controlling section includes a device for determining whether said input picture data is picture data of a first type used as reference for decoding other picture data or picture data of a second type which is not used as reference for decoding other picture data; and said memory section has three memory areas each capable of storing one picture data corresponding to one frame, said controlling section further including:

means for controlling said decoding section and said memory section, so that in the normal reproducing operation mode, decoding of input picture data conducted by said decoding section by using said memory section and readout of decoded picture data from said memory section are simultaneously executed by using respective memory areas, and in the frame-skipped reproducing operation mode, in response to an output of said device for determining the type of input picture data, for input picture data of the first type which is decoded but is not outputted continuously for said second time interval, only decoding is conducted for storage in one of said three memory areas and readout therefrom of said decoded picture data of the first type is not performed, and for input picture data of the second type which is not outputted continuously for said second time interval, decoding is not conducted for storage in any memory area, and means, responsive to an output of said device for determining the type of input picture data, for controlling said memory section, so that for decoded picture data which is obtained by decoding input picture data of said first type for storage in one of said three memory areas and which is not outputted continuously for said second time interval, said first time interval during which said decoded picture data of the first type is held in said one memory area in the normal reproducing operation mode and the frame-skipped reproducing operation mode is defined as a time interval lasting from completion of said decoding until after a time point when another input picture data of the first type inputted after said input picture data of the first type is decoded for storage in one of said three memory areas, and for decoded picture data which is obtained by decoding input picture data of said second type for storage in one of said three memory areas and which is not outputted continuously for said second time interval, said first time interval during which said picture data of the second type is held in said one memory area in the normal reproducing operation mode is defined as a time interval lasting from completion of said decoding until a time point when said decoded picture data of the second type is read out from said one memory, and said first time interval in the frame-skipped reproducing operation mode is defined as zero because decoding of said picture data of the second type is not conducted in the frame-skipped reproducing operation mode.

9. An apparatus according to claim 8, wherein in the normal reproducing operation mode, decoding of input picture data conducted by said decoding section by using said memory section and readout of decoded picture data from said memory section are simultaneously executed by using same memory area.

10. An apparatus according to claim 9, wherein in the normal reproducing operation mode, input picture data and decoded picture data respectively subjected to said decoding and readout simultaneously executed by using the same memory area are in an output order such that said decoded picture data subjected to readout is followed by decoded picture data obtained by said decoding.

11. An apparatus according to claim 8, wherein in the normal reproducing operation mode, decoding of input picture data conducted by said decoding section by using said memory section and readout of decoded picture data from said memory section are simultaneously executed by using different memory areas.

* * * * *